United States Patent [19]

Wedellsborg

[11] Patent Number: 5,465,280
[45] Date of Patent: Nov. 7, 1995

[54] PRESSURE VESSEL APPARATUS

[76] Inventor: Bendt W. Wedellsborg, I. C. E. C. 1995 University Ave., Suite 119, Berkeley, Calif. 94704

[21] Appl. No.: 257,004

[22] Filed: Jun. 8, 1994

[51] Int. Cl.⁶ .................................................. G21C 13/00
[52] U.S. Cl. .................... 376/294; 376/250; 376/280; 376/285; 220/585; 220/586; 220/592
[58] Field of Search .................... 376/250, 280, 376/285, 293, 294, 461; 220/8, 426, 585, 586, 592, 666

[56] References Cited

U.S. PATENT DOCUMENTS

| | | | |
|---|---|---|---|
| 3,433,382 | 3/1969 | Boggio | 220/592 |
| 3,445,971 | 5/1969 | Desmarchais et al. | 376/294 |
| 3,512,675 | 5/1970 | Pennell | 220/586 |
| 3,606,715 | 9/1971 | Wyss et al. | 220/581 |
| 3,653,434 | 4/1972 | Andersson | 376/294 |
| 3,775,251 | 11/1973 | Schabert | 376/294 |
| 3,970,208 | 7/1976 | Raes | 376/294 |
| 4,032,397 | 6/1977 | Beine et al. | 376/293 |
| 4,192,718 | 3/1980 | Janakiev | 376/294 |
| 4,650,642 | 3/1987 | Gluekler et al. | 376/280 |
| 4,767,593 | 8/1988 | Wedellsborg | 376/294 |
| 4,859,402 | 8/1989 | Tupper et al. | 376/285 |
| 5,047,201 | 9/1991 | Schmidt et al. | 376/286 |
| 5,087,409 | 2/1992 | Wedellsborg et al. | 376/294 |
| 5,217,681 | 6/1993 | Wedellsborg et al. | 376/294 |
| 5,229,067 | 7/1993 | Hammers | 376/294 |

OTHER PUBLICATIONS

Containments for Future PWR—Reactors authored by J. Eibl, F. H. Schluter, H. Cuppers, H. H. Hennies, and G. Kessler, published Aug., 1991 in Smirt 11 Transactions vol. A.

Prestressed Safety Enclosure (PSE) with Metallic Cushion for New or Existing Reactor Pressure Vessels, published in SMirt 11 Transactions vol. SD2 (Aug., 1991).

Primary Examiner—Daniel D. Wasil
Attorney, Agent, or Firm—Thomas R. Lampe

[57] ABSTRACT

Pressure vessel apparatus includes upper and lower pressure vessel housings maintained together under pressure by tendons. Bellows are connected to the pressure vessel housings in order to provide leaktight barriers, and to permit motion of the pressure vessel housings. The tendons are divided into two sets, with the tendons of each set of tendons being stressed differently than the tendons of the other set of tendons. The apparatus when utilized as a nuclear reactor pressure vessel includes a core catcher with flotation pool connected to and disposed below the pressure vessel housings and defining a core catcher interior in communication with the pressure vessel interior for receiving core material from the pressure vessel interior resulting from reactor melt-down.

18 Claims, 6 Drawing Sheets

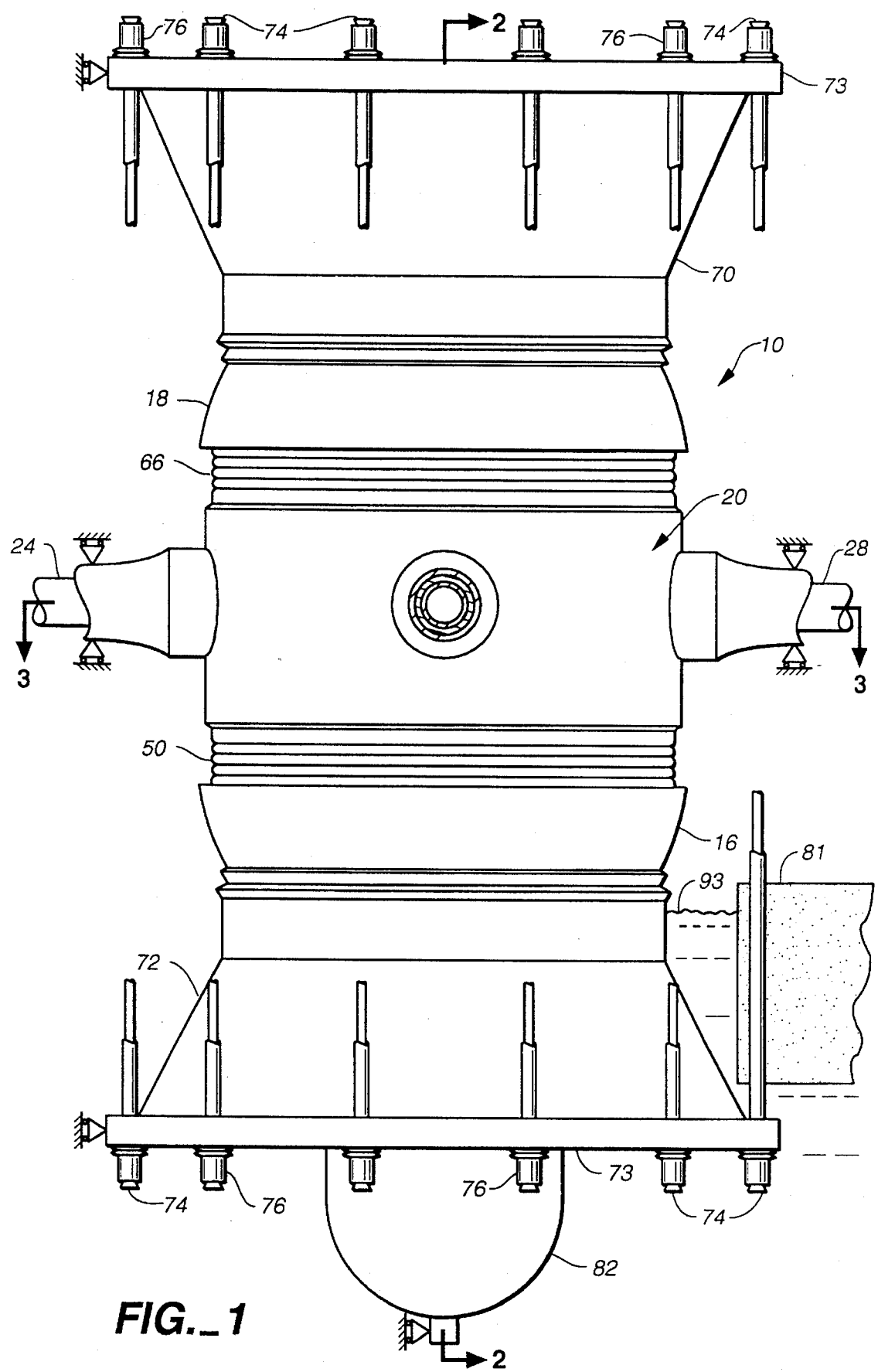
FIG._1

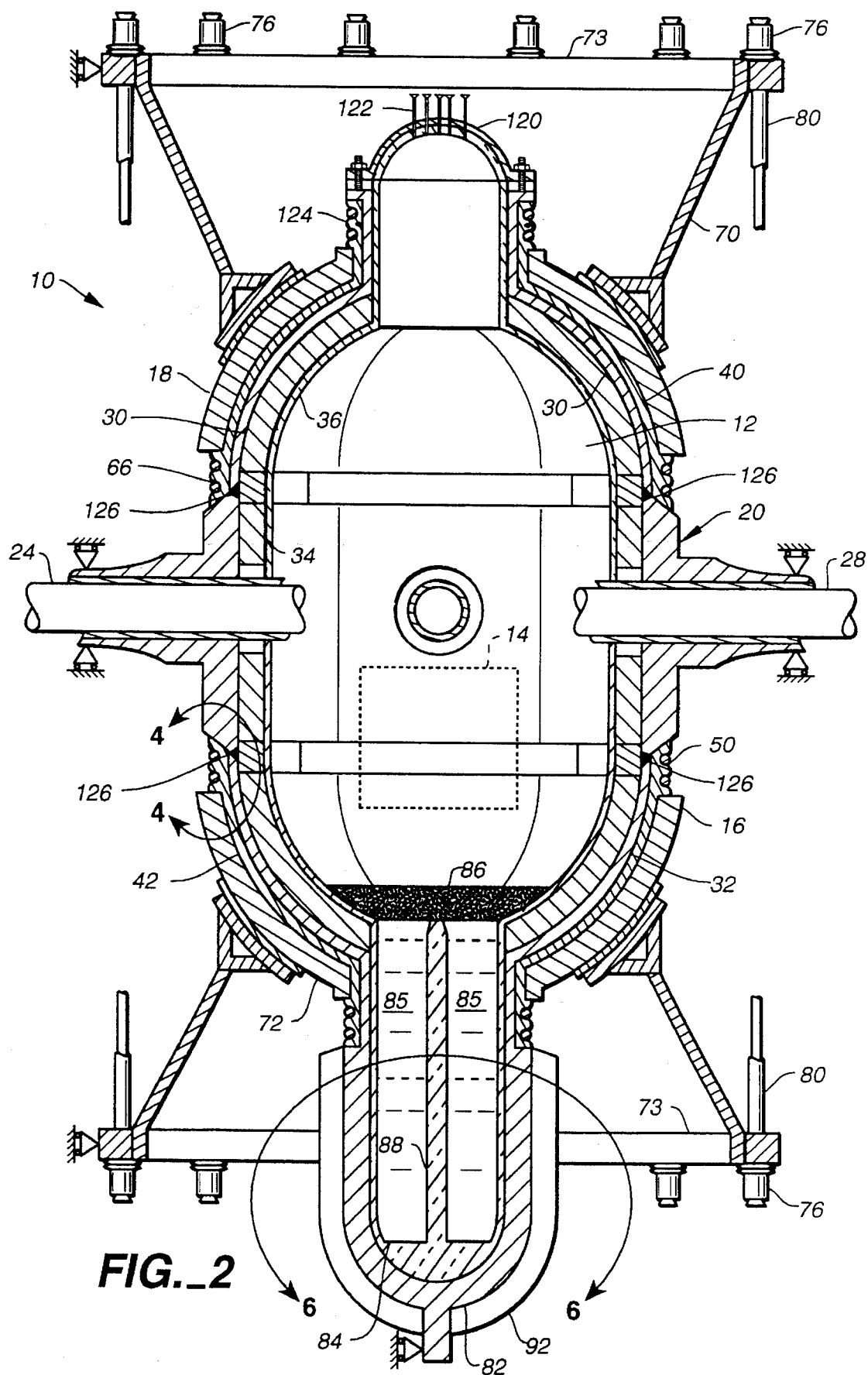
FIG._2

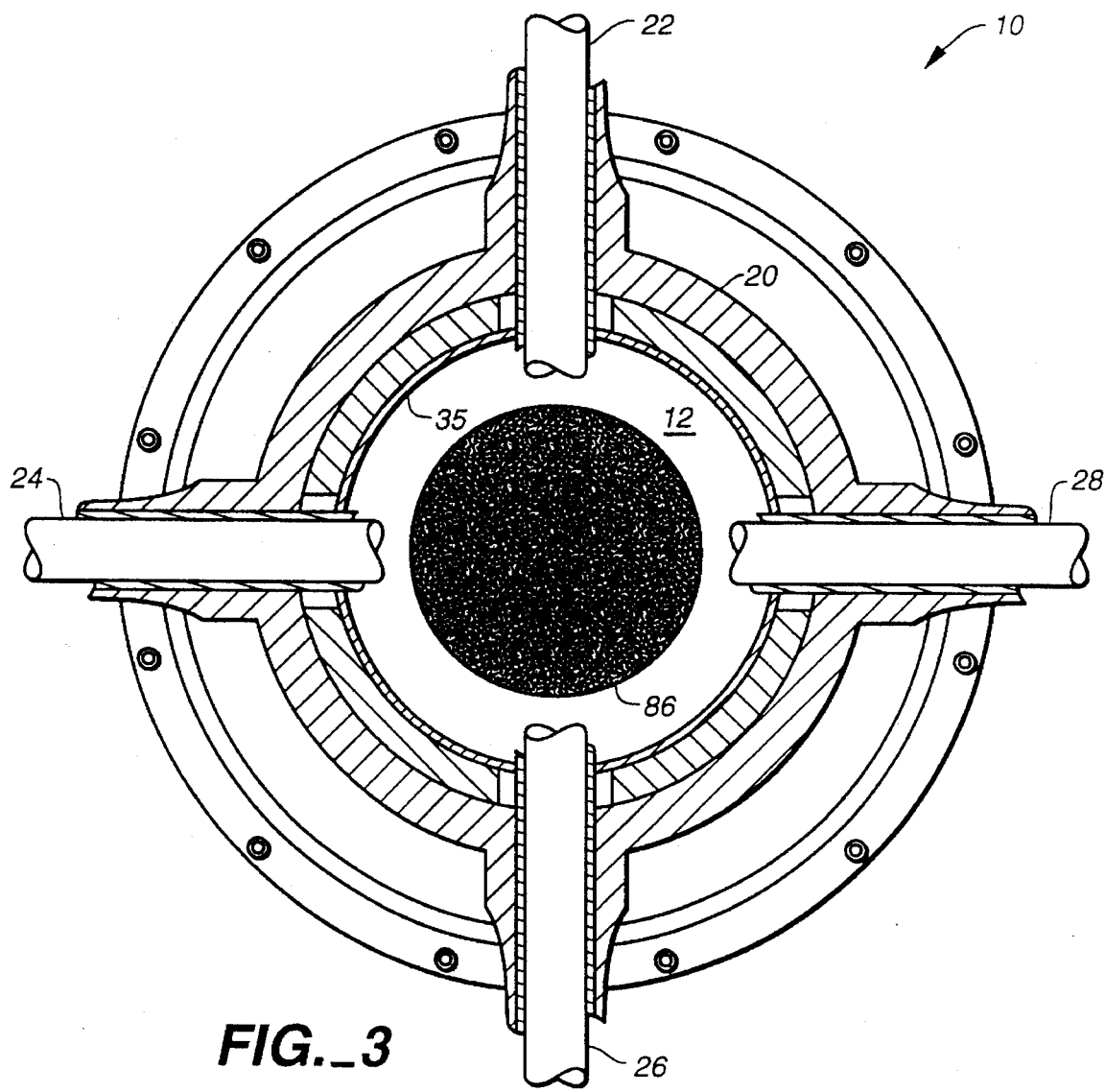
FIG._3
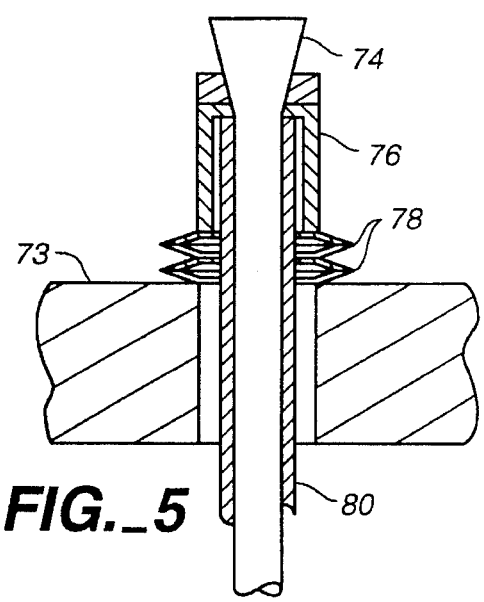
FIG._5

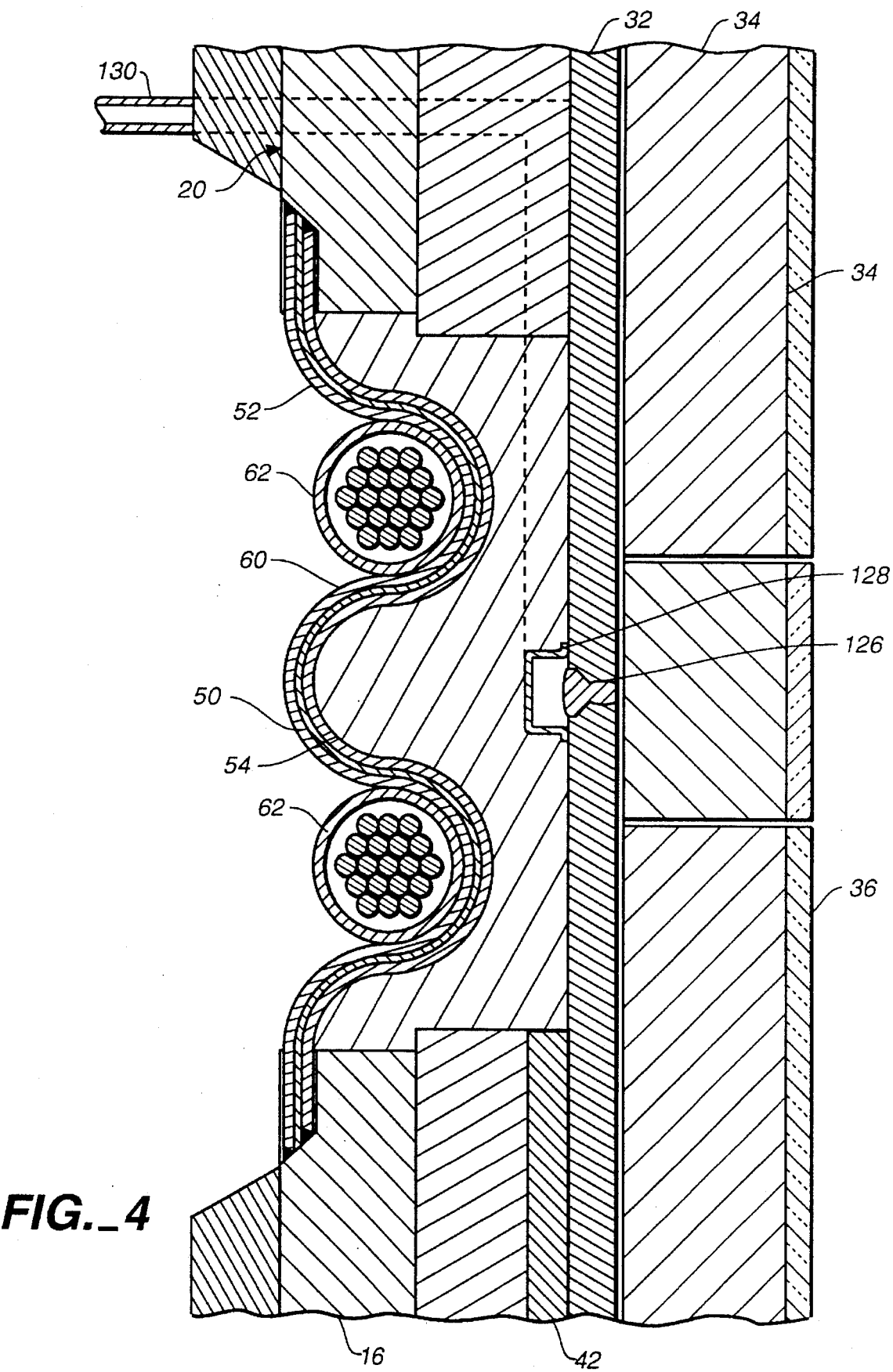
FIG._4

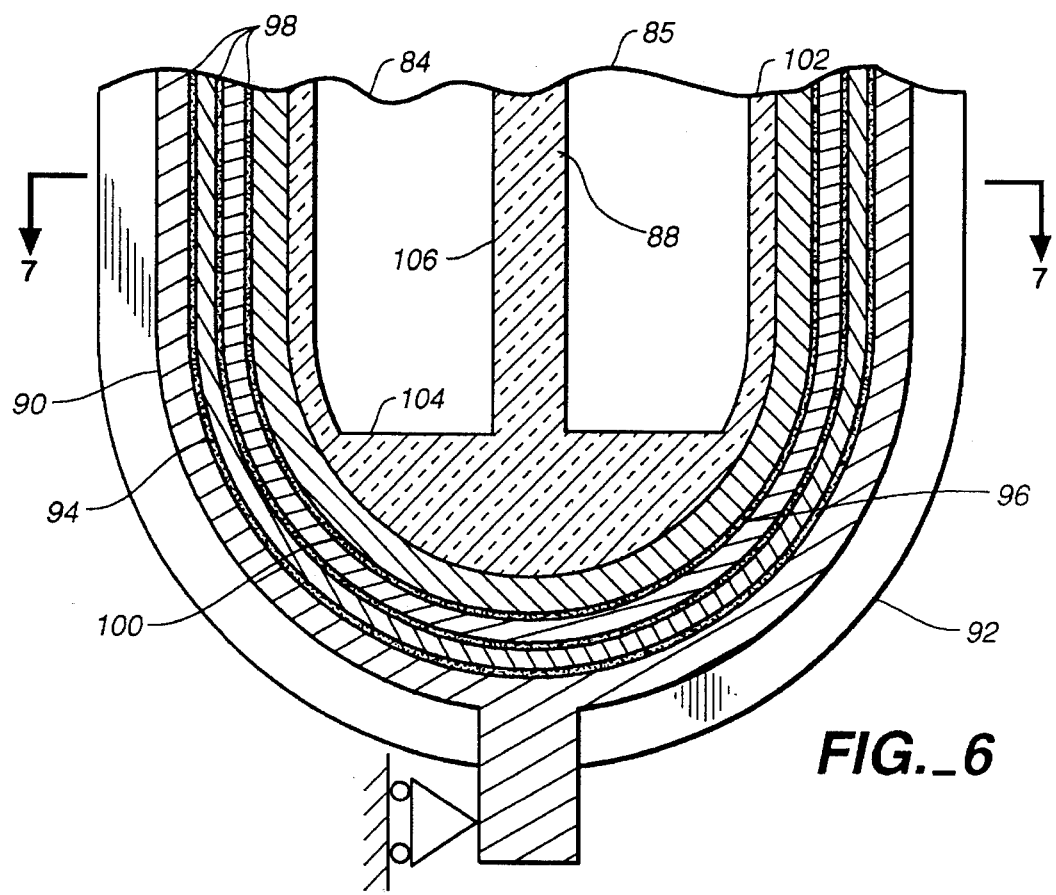
FIG._6
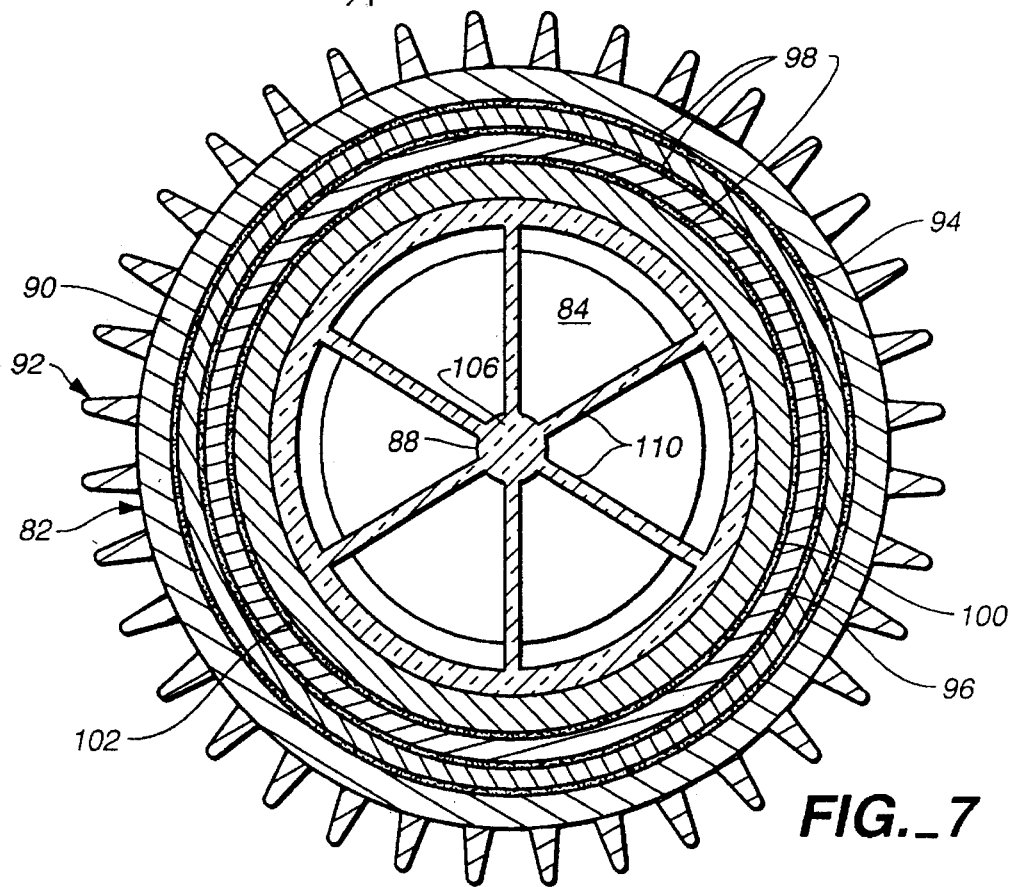
FIG._7

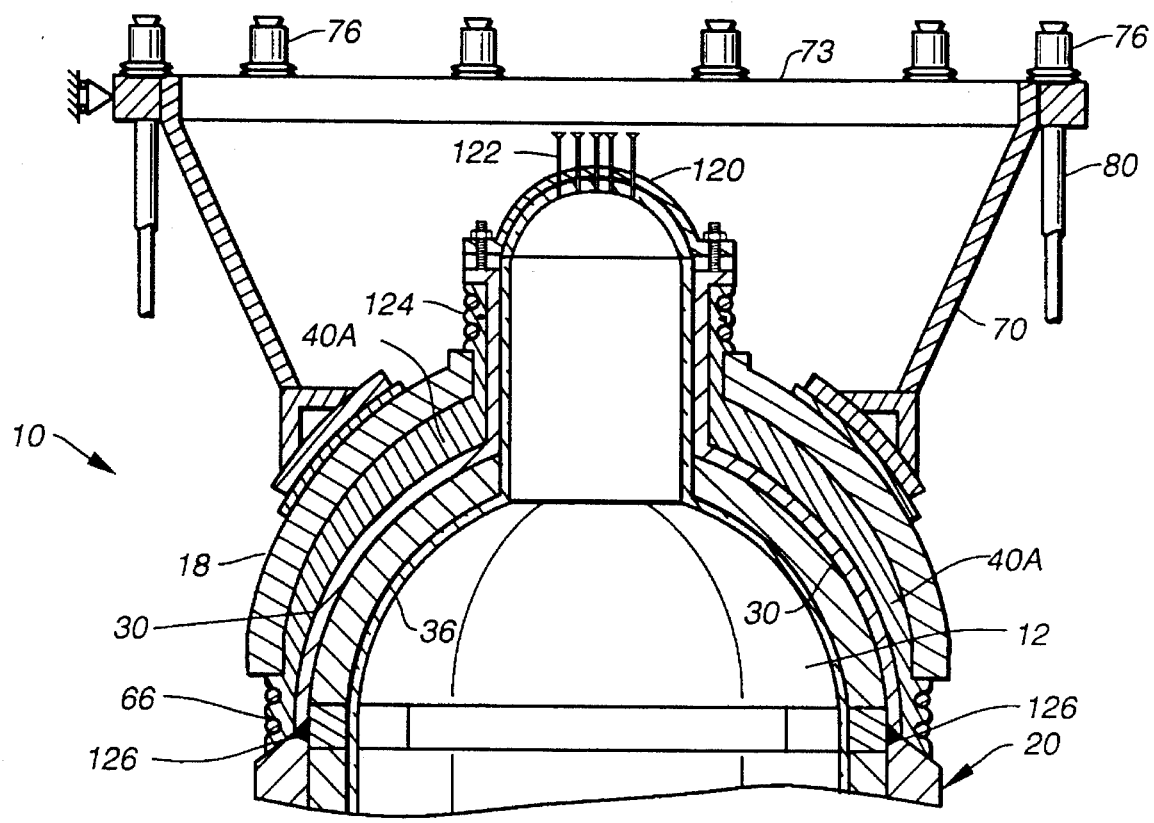
FIG._8

5,465,280

PRESSURE VESSEL APPARATUS

TECHNICAL FIELD

This invention relates to pressure vessel apparatus for containing fluid under pressure. The apparatus disclosed herein has particular application for use as a nuclear reactor vessel.

BACKGROUND ART

My U.S. Pat. No. 5,217,681, issued Jun. 8, 1993, discloses a prestressed pressure vessel safety enclosure used as a pressure safety enclosure for a nuclear reactor pressure vessel or other primary system vessel containing fluid or gaseous material under high pressure. The special pressure vessel enclosure comprises a first pressure vessel containment assembly surrounding the primary pressure vessel. A pair of first upper and lower pressure vessel jackets are adapted to enclose and be spaced apart, respectively, from the upper and lower portions of the first pressure vessel containment assembly with the rims of the jackets adapted to be slidable and sealed with respect to the first pressure vessel containment assembly. The spaces between the jackets and pressure vessel containment assembly are filled with a high boiling point, low melting point metal. Upper and lower ring girders, connected to each other by tension tendon members, in conjunction with upper and lower jacket bearing plates and skirts are used to apply a force to the respective upper and lower jackets for moving the jackets toward or away from each other. This application of force achieves continuously adjustable compression in the pressure vessel safety enclosure walls in order to compensate for creep and relaxation of tendon members and of the enclosure walls.

As will be seen below, the present invention differs in a number of important respects from the invention of U.S. Pat. No. 5,217,681. Among other things, the present apparatus employs bellows in the construction thereof which operate as fluid barriers, confine lead material filler, and allow for relative movement of structural components of the apparatus in a controlled manner. Additionally, the apparatus disclosed herein incorporates connector tendons of a specialized construction, incorporating two sets of tendons, one of which is prestressed almost to yield point, and the other of which is prestressed to a lesser extent for the purpose to be described below.

The apparatus disclosed herein is a nuclear reactor vessel and incorporates a core catcher for the purpose of receiving and safely containing core material from a reactor melt-down. Applicant is aware of a publication entitled *Containments for Future PWR—Reactors* authored by J. Eibl, F. H. Schlüter, H. Cüppers, H. H. Hennies, and G. Kessler, published August, 1991 in SMiRT 11 Transactions Vol. A which relates to a pressure-resistant core catcher system for the purposes of mitigating or avoiding the consequences of a melt-down of a nuclear core. Such design involves the construction of heavy concrete walls around and beneath the reactor vessel with ceramic pans and particle beds positioned on the base mat. Cooling water from the reactor sump is circulated inside the core catcher and after the accident, there is permanent access and/or communication between the core catcher, the failed pressure vessel, and the containment building. The reactor vessel is a conventional single-wall vessel. This arrangement also differs from the present invention in that the prior art core catcher is not an integral part of the reactor vessel.

The following United States patents are also believed to be representative of the state of the prior art: U.S. Pat. Nos. 3,433,382, issued Mar. 18, 1969, 3,775,251, issued Nov. 27, 1973, 4,192,718, issued Mar. 11, 1980, 3,445,971, issued May 27, 1969, U.S. Pat. No. 3,512,675, issued May 19, 1970, 3,653,434, issued Apr. 4, 1972, 3,606,715, issued Sep. 21, 1971, 5,229,067, issued Jul. 20, 1993, 5,047,201, issued Sep. 10, 1991, 4,859,402, issued Aug. 22, 1989, 4,650,642, issued Mar. 17, 1987, and 4,032,397, issued Jun. 28, 1977. Applicant has authored a paper entitled *Prestressed Safety Enclosure (PSE) with Metallic Cushion for New or Existing Reactor Pressure Vessels*, published in SMiRT 11 Transactions Vol. SD2 (August, 1991). The above-identified prior art does not disclose the features noted above believed to be novel with respect to the present invention.

DISCLOSURE OF INVENTION

The present invention relates to pressure vessel apparatus defining a pressure vessel interior for containing fluid under pressure.

The pressure vessel apparatus includes a lower pressure vessel housing and an upper pressure vessel housing.

Connector means connects the lower and upper pressure vessel housings with the upper pressure vessel housing disposed over the lower pressure vessel housing and the upper and lower pressure vessel housings at least partially defining the pressure vessel interior.

The connector means includes at least one bellows extending between the upper and lower pressure vessel housings and allowing relative movement between the upper and lower pressure vessel housings responsive to application of forces on the upper and lower pressure vessel housings.

The connector means additionally comprises a plurality of elongated connectors operatively associated with the upper and lower pressure vessel housings continuously urging the upper and lower pressure vessel housings toward each other.

The plurality of elongated connectors include a first set of tendons prestressed close to yield point and a second set of tendons prestressed to a lesser degree than the first set of tendons whereby the second set of tendons will remain elastic upon movement of the upper and lower pressure vessel housings away from one another upon application of forces thereto a distance sufficient to stretch the first set of tendons into the yield range of the first set of tendons.

In the disclosed preferred embodiment of the invention, the apparatus comprises a nuclear reactor vessel, the pressure vessel interior accommodating a nuclear reactor. The apparatus additionally comprises a core catcher connected to and disposed below the lower pressure vessel housing and defining a core catcher interior in communication with the pressure vessel interior for receiving core material from the pressure vessel interior resulting from reactor melt-down.

Other features, advantages, and objects of the present invention will become apparent with reference to the following description and accompanying drawings.

BRIEF DESCRIPTION OF DRAWINGS

FIG. 1 is an elevational view of apparatus constructed in accordance with the teachings of the present invention;

FIG. 2 is a cross-sectional view taken along the line 2—2 in FIG. 1;

FIG. 3 is an enlarged, cross sectional view taken along the line 3—3 in FIG. 1;

FIG. 4 is a greatly enlarged, partial sectional view taken along the line 4—4 in FIG. 2;

FIG. 5 is an enlarged, sectional view showing details of an end of a tendon employed in the present apparatus and related structure;

FIG. 6 is an enlarged, cross-sectional view taken along the line 6—6 in FIG. 2;

FIG. 7 is an enlarged, cross-sectional view taken along line 7—7 in FIG. 6; and

FIG. 8 is a cross-sectional view illustrating a segment of an alternative embodiment of the apparatus.

BEST MODE FOR CARRYING OUT THE INVENTION

Referring to the drawings, apparatus constructed in accordance with the teachings of the present invention is in the form of a nuclear reactor vessel 10 having an interior 12 for accommodating a nuclear reactor 14 (shown in dash lines in FIG. 2). The nuclear reactor may be of any suitable well known prior art construction.

Vessel 10 includes a lower pressure vessel housing 16 and an upper pressure vessel housing 18. A sleeve 20 is located between the upper and lower vessel housings. Sleeve 20 defines passageways accommodating conduits 22, 24, 26 and 28 which provide for the ingress and egress of liquid and gaseous material relative to the pressure vessel interior so that steam is produced or gas is heated by the reactor in a conventional manner and employed to drive turbines or the like (not shown) in a conventional manner.

In the arrangement illustrated, sleeve 20 includes dome-like ends 30, 32 which are surrounded by upper pressure vessel housing 18 and lower pressure vessel housing 16, respectively. The sleeve may be of any suitable material such as steel. In the arrangement illustrated, the sleeve is of unitary construction and may be fabricated of separate forged or plate segments welded together. The interior of the vessel 10 is lined with a core of cast iron or stainless steel wall components forming an interior wall 34. This is in order to prevent the vessel from buckling. A ceramic or stainless steel lining 36 is formed, anchored, or bonded to interior wall 34.

A layer 40 of lead material, i.e. lead or lead alloy, is disposed between upper pressure vessel housing 18 and dome-like end 30. Likewise, a lead material layer 42 is located between lower pressure vessel housing 16 and the dome-like end 32. The lead layers serve as lubricants and pressure transfer media which may swell or shrink during operation of the apparatus and during transients, as they heat up, melt, cool down, and freeze. Such an arrangement not only adjusts for and accommodates changes in temperature but also lessens the need somewhat for exacting machining during fabrication of the apparatus components.

In order to confine the fluid which may emanate from the pressure vessel interior in case of rupture bellows 50 is secured to and extends between lower pressure vessel housing 16 and sleeve 20. As may perhaps best be seen with reference to FIG. 4, the bellows 50 defines along with sleeve 20 and lower pressure vessel housing 16 a void filled with lead material. If desired, the lead in the void may be in communication with the lead material 42 disposed in the layer between lower pressure housing 16 and dome-like end 32. Thus, the lead material when heated will be free to flow as required to accommodate relative movement between the apparatus components. Alternatively, a suitable seal (not shown) may be employed to avoid such communication, if desired.

In the arrangement illustrated, the bellows 50 is formed of two layers of sheet steel or other suitable sheet material 52, 54 welded or otherwise secured into place with respect to sleeve 20 and lower pressure housing 16. A layer 56 of lead or lead alloy material or wire mesh is disposed between sheets 52, 54 to accommodate and allow for relative movement therebetween. It will be appreciated that the bellows 50 is in the form of a band extending about the periphery of the apparatus.

In the arrangement illustrated, the bellows 50 has a curved cross-section and forms two recesses 60. Reinforcement bands 62 are positioned in the recesses 60, engage the outer surface of the outermost sheet 52, and urge the layers of flexible sheet material in the direction of the pressure vessel interior. In the arrangement illustrated, bands 62 are illustrated somewhat schematically, being in the form of steel bands, rings or prestressed tendon cables having an outer layer of circular cross section surrounding the cable elements per se.

A bellows 66 of like construction extends between sleeve 20 and upper pressure vessel housing 18.

An upper bearing skirt 70 bears against upper pressure vessel housing 18 and a lower bearing skirt 72 bears against lower pressure vessel housing 16. Each of the bearing skirts has an outer flange 73 defining apertures accommodating cable-like tendons 74 extending between the bearing skirts. These tendons 74 are employed to exert end-wise compressive forces on the upper and lower pressure vessel housings through the bearing skirts to continuously urge the pressure vessel housings toward one another. That is, compressive forces will be exerted on the pressure vessel housings, the sleeve 20, the lead material layers 40, 42, and the dome-like ends 30 and 32 including the full penetration "butt" weld 126. Thus all of the fluid-confining vessel components are compressed (as opposed to the existing state of the art pressure vessels which are in tension).

FIG. 5 shows details of an end of a representative tendon 74. The end of the tendon 74 is enlarged and seated in a receptacle 76 disposed upon disk-type spring washers 78. Receptacle 76 is preferably an adjustable tendon anchor of any suitable type so that adjustment of the tension on the tendon may be readily accomplished. Since such a tension adjustment mechanism is well known and not part of the present invention it has not been described in detail. Tendons 74 preferably pass through sleeves 80 which in turn pass through surrounding concrete structure, a portion of such structure being shown in FIG. 1 and identified by reference numeral 81. The structure not only serves to protect vessel 10 but to stabilize the positioning thereof. The biological shield concrete structure 81 surrounding the vessel protects the tendons against heat, radiation and even explosive attack from the outside.

An important aspect of the present invention resides in the fact that the tendons 74 are divided into two sets. One set of tendons has the tendons thereof prestressed close to yield. In the case of an accident the tendons of this first set of tendons will absorb most of the explosion energy by stretching into the plastic range. The other set of tendons of the tendon system are preferably supported on disc springs, and only slightly prestressed and thus will remain elastic even in the case of vessel rupture where explosive forces within the pressure vessel will exert pulling forces thereon.

When the internal pressure within the vessel subsides after an explosion, the vessel housing components will settle back into the initially closed position.

Another important aspect of the present invention resides in its employment of a core catcher 82 defining a core catcher interior 84 in communication with the interior 12 of the vessel 10 per se and submerged under and cooled by cooling water 93 located in the reactor cavity between the nuclear reactor vessel 10 and the biological shield 81. According to the teachings of the present invention, the core catcher interior 84 is filled with lead or lead alloy 85 and a layer of pellets 86 formed from either magnesium oxide or zirconium oxide is disposed above the lead or lead alloy 85. In the arrangement illustrated, a divider or partition defining means 88 extends upwardly from the bottom of the core catcher interior to divide the core catcher interior into segments.

The core catcher 82 includes an outer steel jacket 90 having heat radiating ribs 92 projecting therefrom. The core catcher is of multi-layer, i.e. multi-walled, construction including inner walls 94, 96 of steel, the outer jacket and walls all being separated by layers of lead material 98. The core catcher also includes an inner wall 100 formed from cast iron blocks located adjacent to the innermost lead material layer.

Divider or partition defining means 88 is formed of a suitable high temperature resistant ceramic material incorporating boron. The divider includes a side wall 102 and a bottom wall 104. A centrally disposed post or spindle 106 projects upwardly from the bottom wall 104 and divider walls 110 extend between the post 106 and the divider side wall 102 to segment or divide the interior of the core catcher. The divider 88 is the receptacle for the lead within the interior of the core catcher.

In the event of an accident, the molten core debris will initially float, while the decay heat is removed by cooling of the core catcher through the walls which are thermally-bonded (lead-steel), high thermal conductivity walls with an extended surface of radial fins. This will result in transfer of the decay heat after a nuclear accident from the core catcher to the cooling water 93 in the reactor cavity, without causing a large increase in the temperatures of the core catcher walls, which would lessen the structural capacity of the walls to carry the enormous pressure which will exist in the core catcher after the accident.

The cast-iron block inner wall of the core catcher absorbs and stores the decay heat which initially is generated at a large rate immediately after melt-down. Then later, when the decay heat generation rate has dropped, the heat stored in the cast iron blocks will be given off and transferred to the cooling water in the reactor cavity through the high thermal conductance wall.

When the core melts and reaches the core catcher, the "corium" will fuse with the layer of pellets 86. The corium fragments will float on the lead material pool 85 or sink very slowly. Thus, the core will melt and float. It will not melt-down. The heaviest portion of the corium is $UO_2$ (uranium dioxide) with a density of about 10.5 grams per cubic centimeter while the lead is slightly heavier (density 11.3 grams per cubic centimeter). The lead which comes into contact with the corium fragments will melt and may evaporate and condense on the upper reactor vessel walls inside face and drop back into the pool, thus tending to maintain the level of the pool.

The purpose of the ceramic inner lining and its associated divider walls is to protect the steel walls of the core catcher from the hot corium and lead in the pool 85 which can reach, for example, a temperature of about 4,000 degrees Fahrenheit. The use of boron carbide or boron containing ceramic is proposed in order to prevent any possibility of nuclear recriticality from taking place when the molten core flows down into the core catcher, changing the core geometry.

In the interest of simplicity, the pressure vessel housings of the apparatus have been illustrated with a single layer of lead. However, it is anticipated that the pressure vessel housings, in actual practice, will usually be of multi-layer or multi-wall construction, similar to the multi-layer construction of the core catcher. That is, the pressure vessel housings can incorporate many wall layers and many layers of lead or other metallic material therebetween, if desired.

The apparatus also includes a vessel head 120 providing access to the interior of the apparatus and for accommodating control rods and/or refuelling pipes and/or instrumentation 122. A bellows 124 similar in construction to bellows 50 is employed between the vessel head and upper pressure vessel housing 18.

FIG. 4 illustrates an arrangement which can be employed to detect leakage of pressurized fluid through a vessel weld joint. A full penetration circumferential butt weld 126 connects sleeve 20 to dome-like end 32. A channel member 128 is welded to sleeve 20 and dome-like end 32 with the interior of the channel member in communication with the weld. The lead within the void behind bellows 50 covers the channel member. A conduit 130 extends from the interior of the channel member and provides communication between the interior of the channel member and suitable instrumentation (not shown) so that weld failure can be detected.

FIG. 8 illustrates the upper end of an alternative form of apparatus constructed in accordance with the teachings of the present invention. In this embodiment, a layer 40A of filler material other than lead is disposed under upper vessel housing 18. In particular, the layer 40A is comprised of a filler material having a melting point exceeding, or at least close to, the service temperature of the reactor. To function in a manner to be described below, the filler material must be elastic, with a modulus of elasticity substantially less than the enclosing steel shells of the housing. The filler material is preferably metallic, a suitable material being a "soft" alloy of aluminum or cast aluminum.

As can clearly be seen in FIG. 8, the filler material layer has a generally crescent-shaped cross-section, the layer being thickest at the top and gradually becoming thinner as it proceeds in a downward direction. This approach results in uniform compressive forces at the outer surface of the reactor vessel dome-like end 30 as a consequence of downward motion of the housing 18 and production of elastic compressive radial stresses in the filler material layer 40A.

This uniform radial pressure distribution is caused by the crescent shape of the elastic filler material which acts as a pressure transfer medium, and which converts the vertical load exerted by the tendons and housing into a substantially uniform radial pressure acting on the pressure vessel.

I claim:

1. Pressure vessel apparatus defining a pressure vessel interior for containing fluid under high temperature and pressure, said pressure vessel apparatus comprising, in combination:

a lower pressure vessel housing;

an upper pressure vessel housing;

connector means connecting said lower and upper pressure vessel housings, with said upper pressure vessel housing disposed over said lower pressure vessel housing, and said upper and lower pressure vessel housings at least partially defining said pressure vessel interior, said connector means including at least one bellows extending between said upper and lower pressure vessel housings and allowing relative movement between said upper and lower pressure vessel housings responsive to application of forces on said upper and lower pressure vessel housings, and said connector means additionally comprising a plurality of elongated connectors operatively associated with said upper and lower pressure vessel housings continuously urging said upper and lower pressure vessel housings toward each other.

2. The apparatus according to claim 1 wherein said plurality of elongated connectors include a first set of tendons prestressed close to yield point and a second set of tendons prestressed to a lesser degree than said first set of tendons whereby said second set of tendons will remain elastic upon movement of said upper and lower pressure vessel housings away from one another upon application of forces thereto a distance sufficient to stretch the first set of tendons into the yield range of said first set of tendons.

3. The apparatus according to claim 1 additionally comprising sleeve means located between said upper and lower pressure vessel housings, at least one bellows extending between said upper pressure vessel housing and said sleeve means and at least one bellows extending between said lower pressure vessel housing and said sleeve means.

4. The apparatus according to claim 1 additionally comprising an upper bearing skirt engaging and bearing against said upper pressure vessel housing and a lower bearing skirt engaging and bearing against said lower pressure vessel housing, said elongated connectors being under tension and extending between said upper and lower bearing skirts and through a concrete structure at least partially surrounding said pressure vessel apparatus.

5. The apparatus according to claim 1 comprising a nuclear reactor vessel, said pressure vessel interior accommodating a nuclear reactor, said apparatus additionally comprising a core catcher disposed below said lower pressure vessel housing and defining a core catcher interior in communication with said pressure vessel interior for receiving core material from said pressure vessel interior resulting from reactor melt-down.

6. The apparatus according to claim 5 wherein said core catcher interior is substantially filled with material at least partially comprising lead.

7. The apparatus according to claim 6 additionally comprising a plurality of pellets forming a layer on said material.

8. The apparatus according to claim 7 wherein said pellets are formed of magnesium oxide.

9. The apparatus according to claim 7 wherein said pellets are formed of zirconium oxide.

10. The apparatus according to claim 5 wherein said core catcher is of multi-layer construction and includes a layer of cast iron and a layer of lead material.

11. The apparatus according to claim 5 wherein said core catcher includes a lining of ceramic material and partition defining means dividing said core catcher interior into core catcher interior segments, said partition defining means also being formed of ceramic material.

12. The apparatus according to claim 5 wherein said core catcher includes an outer wall and heat dissipating fins affixed to said outer wall and extending outwardly from said outer wall.

13. The apparatus according to claim 1 wherein said bellows comprises at least one layer of flexible sheet material extending about the periphery of said pressure vessel apparatus and defining at least one recess along the length thereof.

14. The apparatus according to claim 13 additionally comprising at least one reinforcement member positioned in a recess of a layer of flexible sheet material, engaging an outer surface of the layer of flexible sheet material, and urging the layer of flexible material in the direction of said pressure vessel interior.

15. The apparatus according to claim 13 wherein said bellows comprises a plurality of layers of heat resistant, flexible sheet material having lead material therebetween.

16. The apparatus according to claim 1 wherein said lower pressure vessel housing and said upper pressure vessel housing are each of multi-layer construction including at least one layer of lead material.

17. The apparatus according to claim 1 additionally comprising a channel member defining a channel located at a vessel weld joint to receive any leakage of pressurized fluid through said vessel weld joint from said pressure vessel interior whereby said leakage can be monitored.

18. The apparatus according to claim 1 comprising a nuclear reactor pressure vessel wherein at least one of said pressure vessel housings is of multi-layer construction and includes a layer of solid elastic filler material having a melting point close to or exceeding the service temperature of a nuclear reactor in said nuclear reactor pressure vessel, said layer of elastic filler material having a generally crescent-shaped cross section and a modulus of elasticity substantially less than said pressure vessel housings.

\* \* \* \* \*